United States Patent [19]

Han

[11] Patent Number: 5,483,367
[45] Date of Patent: Jan. 9, 1996

[54] TRANSMITTING AND RECEIVING APPARATUS FOR A RADIO HEADPHONE

[75] Inventor: Jeong T. Han, Seoul, Rep. of Korea

[73] Assignee: Goldstar Co., Ltd., Seoul, Rep. of Korea

[21] Appl. No.: 815,200

[22] Filed: Dec. 31, 1991

[30] Foreign Application Priority Data

Dec. 31, 1990 [KR] Rep. of Korea ............ 90-22593/1990

[51] Int. Cl.$^6$ .................................................. H04J 14/00
[52] U.S. Cl. .......................... 359/124; 359/158; 359/182; 381/2
[58] Field of Search .................................. 359/125, 137, 359/182, 124, 132, 133, 134, 158, 145; 455/151.2; 381/2–6, 10–11, 14; 370/121, 76; 375/38

[56] References Cited

U.S. PATENT DOCUMENTS

| | | | |
|---|---|---|---|
| 3,727,062 | 4/1973 | Foster | 359/132 |
| 4,621,282 | 11/1986 | Ahern | 359/137 |
| 4,677,608 | 6/1987 | Forsberg | 359/182 |
| 4,882,773 | 11/1989 | Maloney | 359/182 |
| 4,899,388 | 2/1990 | Mlodzikowsk | 359/124 |
| 4,928,318 | 5/1990 | Ibe | 359/182 |
| 4,941,208 | 7/1990 | Olshansky | 359/132 |
| 4,949,170 | 8/1990 | Yanagidaira | 359/125 |
| 4,959,827 | 9/1990 | Grotzinger | 359/132 |
| 5,136,411 | 8/1992 | Paik | 359/125 |

FOREIGN PATENT DOCUMENTS 0284955 11/1988 Japan .................. 359/124

Primary Examiner—Leslie Pascal

[57] ABSTRACT

A transmitter and receiving apparatus from a headphone, comprising a demodulating circuit for demodulating a received broadcasting signal into multi-channel data, a modulating circuit for frequency-modulating each channel of the multi-channel data with a different carrier frequency, said carrier frequencies being selectable by the user to avoid local interference, and a transmitting circuit for transmitting output data from said modulating circuit externally. There is also provided a receiver for a radio headphone, comprising a data receiving circuit for receiving data transmitted from an external transmitting circuit, a demodulator for dividing the data received by said data receiving circuit into separate frequency channels, an envelope detecting circuit for detecting envelopes of respective channel data, and an output circuit for outputting an output signal from said envelope detecting circuit as an analog sound signal so as to allow a user to listen to noiseless sound through a headphone.

15 Claims, 6 Drawing Sheets

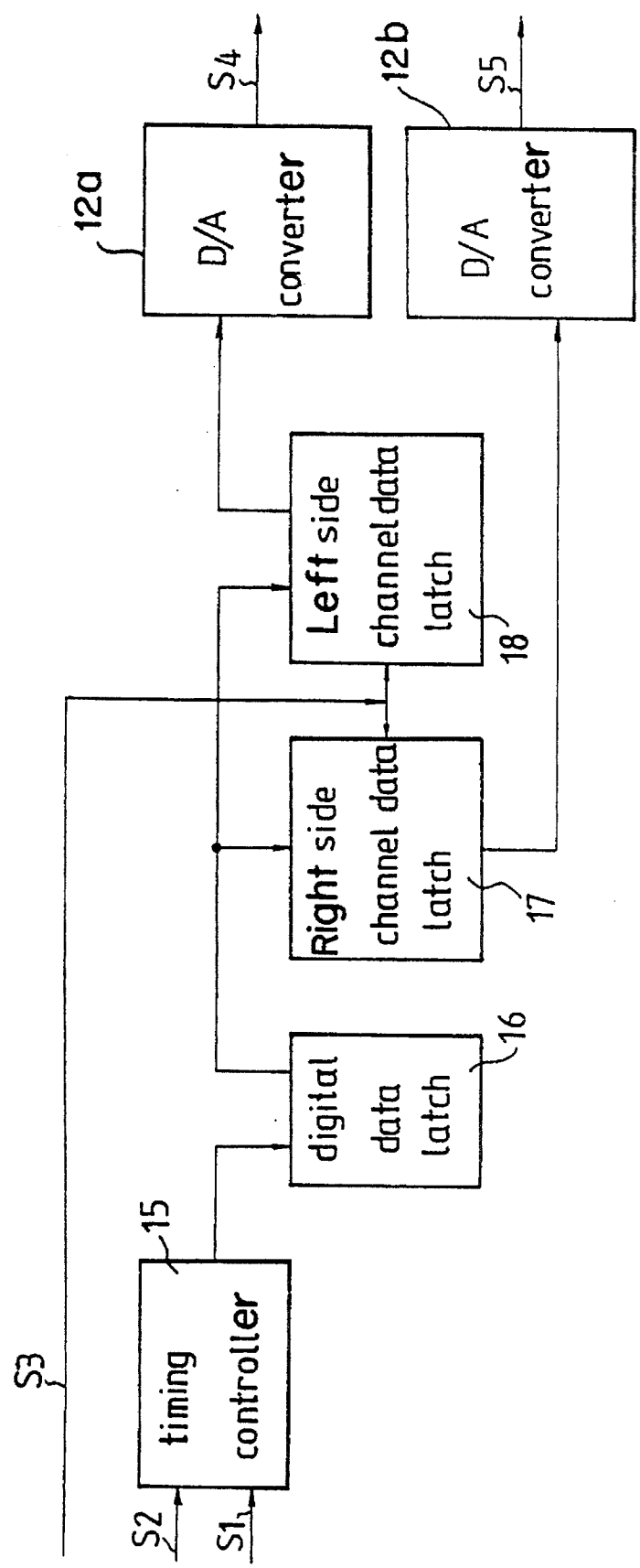

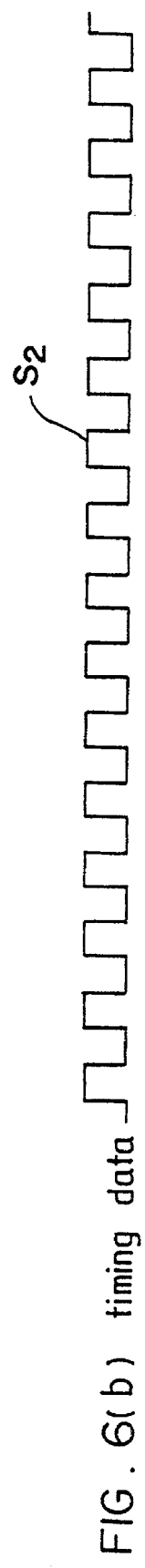
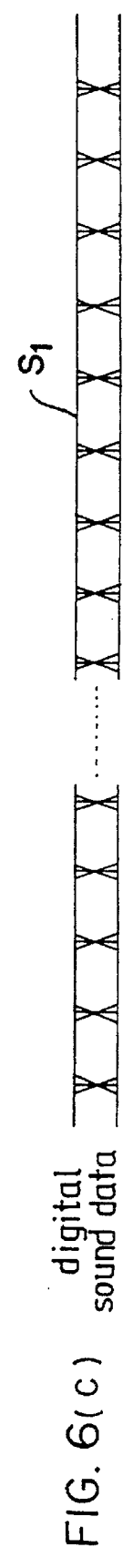
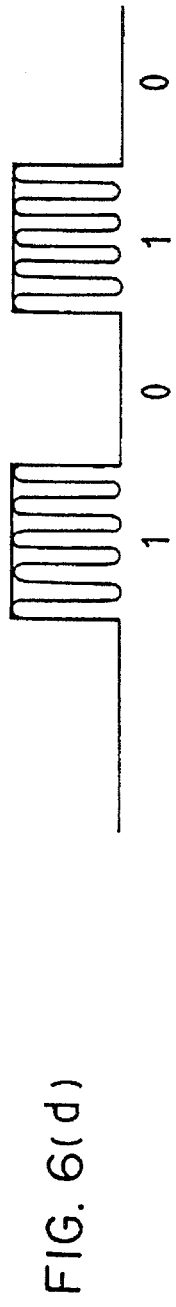
FIG. 6(a) digital channel information data
FIG. 6(b) timing data
FIG. 6(c) digital sound data
FIG. 6(d)

TRANSMITTING AND RECEIVING APPARATUS FOR A RADIO HEADPHONE

BACKGROUND OF THE INVENTION

1. Field of the Invention

The present invention relates in general to a radio transmitting and receiving apparatus, and more particularly to a transmitting and receiving apparatus for a headphone of the digital type.

2. Description of the Prior Art

With reference to FIG. 1, there is shown a block diagram of a conventional transmitting apparatus for a headphone of the analog type. The illustrated transmitting apparatus comprises a first amplifying circuit 33 including amplifiers 31 and 32 for amplifying respectively a left sound signal L/S and a right sound signal R/S from a headphone output of a television set or a radio set by a predetermined amplification degree, a frequency modulating circuit 35 including frequency modulators 35a and 35b for frequency-modulating respective output signals from the amplifiers 31 and 32 in the first amplifying circuit 33, a first band-pass filtering circuit 36 including band-pass filters 36a and 36b for filtering respective output signals from the frequency modulators 35a and 35b in the frequency modulating circuit 35 to pass only frequency components of desired band width, and a transmitting circuit 37 including a transistor Q4 and a light-emitting diode D5, for transmitting output signals from the band-pass filters 36a and 36b in the first band-pas filtering circuit 36 with infrared rays carrying the signals.

With reference to FIG. 2, there is shown a block diagram of a conventional receiving apparatus for a headphone of the analog type. The illustrated transmitting apparatus comprises a circuit 38 including a transistor Q5 and a light-receiving diode D8, for receiving light signals transmitted from the transmitting circuit 37 in the transmitting apparatus and amplifying the received signals by a predetermined amplification degree, a second band-pass filtering circuit 41 including band-pass filters 39 and 40 for filtering respective output signals from the receiving circuit 38 to pass only frequency components of desired band width, a demodulating circuit 44 including demodulators 42 and 43 for demodulating respective output signals from the band-pass filters 39 and 40 in the second band-pass filtering circuit 41, a second amplifying circuit 47 including amplifiers 45 and 46 for amplifying respective output signals from the demodulators 42 and 43 in the demodulating circuit 44 by a predetermined amplification degree, and a sound output circuit 52 including a switch SW1, resistors R3 and R4, power amplifiers 48 and 49 and headphone speakers 50 and 52, for outputting analog sound signals from the amplifiers 45 and 46 in the second amplifying circuit 47 as sound signals.

The operation of the conventional transmitting and receiving apparatus for a headphone of the analog type which is constructed as mentioned above will be described.

Generally, the left sound signal L/S and the right sound signal R/S through the headphone output of the television set or radio set are weak in level. For this reason, in the transmitting apparatus, the left sound signal L/S and the right sound signal R/S are amplified by a predetermined amplification degree, respectively, by the amplifiers 31 and 32 in the first amplifying circuit 33. These amplified signals from the amplifiers 31 and 32 are frequency-modulated, respectively, by the frequency modulators 35a and 35b in the frequency-modulating circuit 35 and the frequency-modulated signals from the frequency modulators 35a and 35b are then applied to the band-pass filters 36a and 36b in the first band-pass filtering circuit 36.

Upon receiving the frequency-modulated signals from the frequency modulators 35a and 35b, the band-pass filters 36a and 36b filter, respectively, the received signals to pass only frequency components of desired band width. Then, the output signals from the band-pass filters 36a and 36b are transmitted to the light-receiving diode D8 in the receiving circuit 38 in the receiving apparatus through the light-emitting diode D5 in the transmitting circuit 37.

At this time, a diode D7 emits a light signal which is indicative of signal transmission. An LED driver 34 functions to drive the diode D7.

In the receiving apparatus, the signals inputted through the light-receiving diode D8 in the receiving circuit 38 are amplified, respectively, by a predetermined amplification degree by the transistor Q5 in the receiving circuit 38. Then, the band-pass filters 39 and 40 in the second band-pass filtering circuit 41 filter the amplified signals, respectively, from the receiving circuit 38 to pass only frequency components of desired band width. In the demodulating circuit 44, the demodulators 42 and 43 demodulate the output signals from the band-pass filters 39 and 40, respectively. Then, the demodulated signals are amplified by the amplifiers 45 and 46 in the second amplifying circuit 47. In the second amplifying circuit 47, the resistor R1 and the capacitor C1, and the resistor R2 and the capacitor C2 operate, respectively, as low-pass filters. In the sound output circuit 52, the amplified left and right signals from the amplifiers 45 and 46 are inputted to the power amplifiers 48 and 49 in mono or stereo in accordance with a selection of the switch SW1. Upon receiving the amplified left and right signals from the amplifiers 45 and 46, the power amplifiers 48 and 49 amplify the received signals, respectively, by a given amount and output the amplified signals as sound signals through the headphone speakers 50 and 51.

However, the conventional transmitting and receiving apparatus for a headphone of the analog type has a disadvantage, in that the apparatus is susceptible to noise. For this reason, when the apparatus transmits the signals utilizing an infrared ray, a malfunction thereof may occur according to a direction of the TV set or radio set. Also, there may occur interference due to an infrared ray signal from other systems.

SUMMARY OF THE INVENTION

Therefore, the present invention has been made in view of the above problem, and it is an object of the present invention to provide transmitting and receiving apparatus for a headphone of the digital type, which processes audio signals from a television set or radio set in a frequency modulation (FM) manner, transmits the FM processed audio signals by wireless in a digital transmission manner and receives the transmitted signals by wireless in a digital reception manner.

In accordance with one aspect of the present invention, there is provided a transmitting and receiving apparatus for a headphone, comprising: transmitting means for demodulating a received broadcast audio signal into a digital signal, frequency-modulating the digital signal in accordance with predetermined carrier frequencies corresponding to contents of channel data, and transmitting the frequency-modulated digital signal with an infrared ray carrying the signal; and receiving means for receiving the signal transmitted from said transmitting means, demodulating the received signal into a digital signal, converting the demodulated digital signal into an analog signal, and transducing/outputting the analog signal as sound.

In accordance with another aspect of the present invention, there is provided a transmitter for a headphone, comprising: demodulating means for demodulating a received broadcast audio signal into a digital signal, dividing the digital signal into three-channel data; namely, sound data, data for synchronization of the sound data, and data indicative of whether the sound data is in mono or in stereo; modulating means for frequency-modulating the three-channel data from said demodulating means in accordance with predetermined carrier frequencies corresponding to the three-channel data; and transmitting means for transmitting output data from said modulating means externally.

In accordance with still another aspect of the present invention, there is provided a receiver for a headphone, comprising: data receiving means for receiving data transmitted from the transmitting means; envelope detecting means for dividing the data received by said data receiving means into data by channel and detecting envelopes of respective channel data; and output means for outputting an output signal from said envelope detecting means as an analog sound signal.

BRIEF DESCRIPTION OF THE DRAWINGS

The above and other objects, features and advantages of the present invention will be more clearly understood from the following detailed description taken in conjunction with the accompanying drawings, in which:

FIG. 5 is a block diagram of a D/A converting circuit in the receiving apparatus in FIG. 4.

FIGS. 6a through 6d are waveform diagrams of digital signals in accordance with the present invention.

DETAILED DESCRIPTION OF PREFERRED EMBODIMENTS

First, a construction of transmitting and receiving apparatus for a headphone of the digital type in accordance with the present invention will be described with reference to FIGS. 3 through 5.

Figure 1:
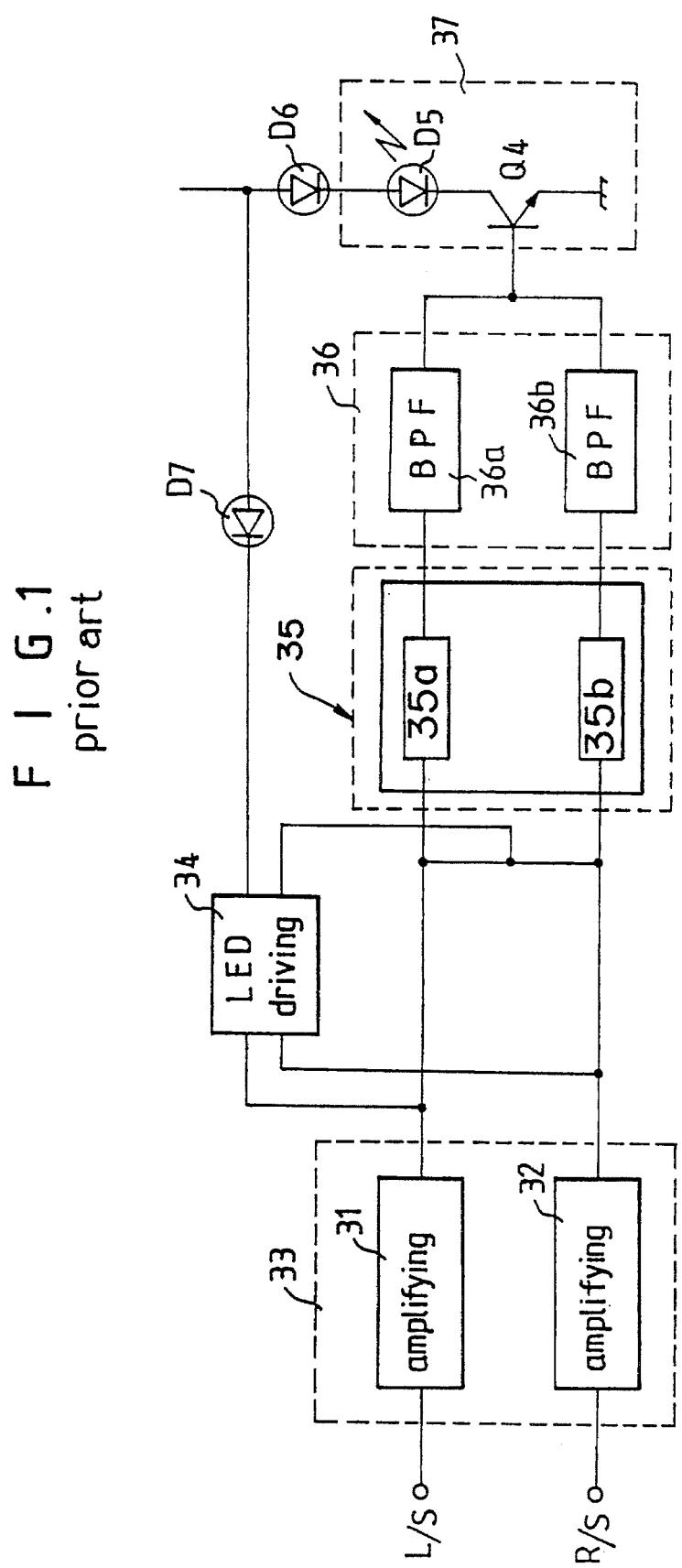
FIG. 1 is a block diagram of conventional transmitting apparatus for a headphone of the analog type.
Figure 2:
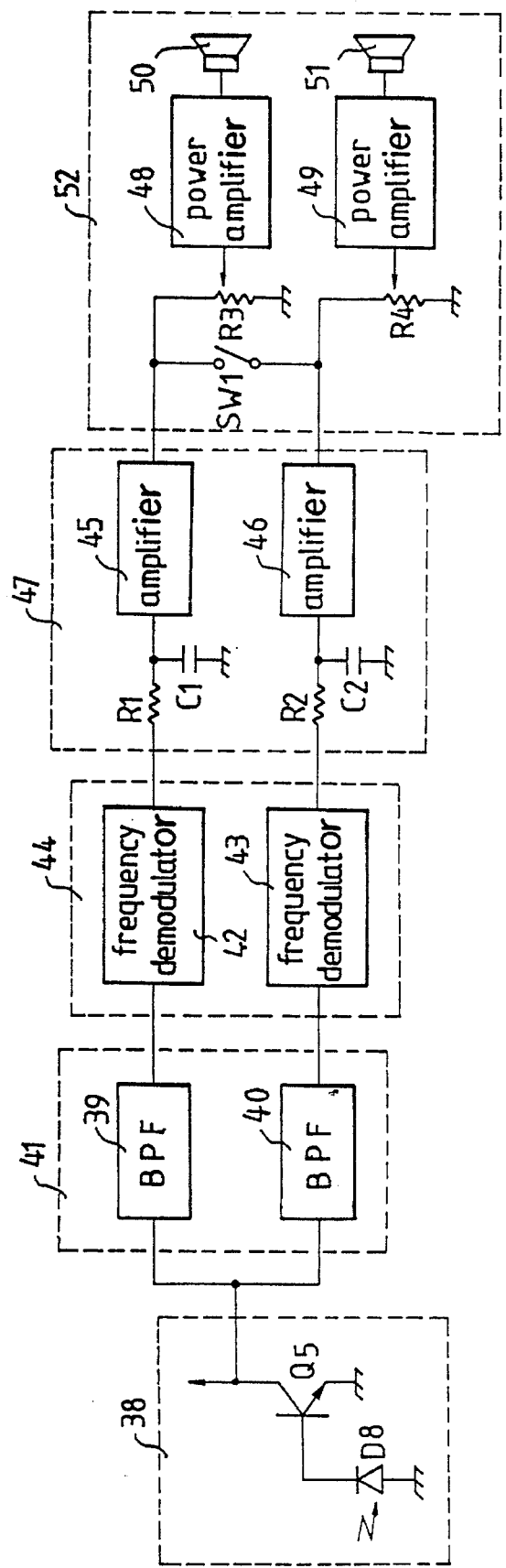
FIG. 2 is a block diagram of conventional receiving apparatus for a headphone of the analog type.
Figure 3:
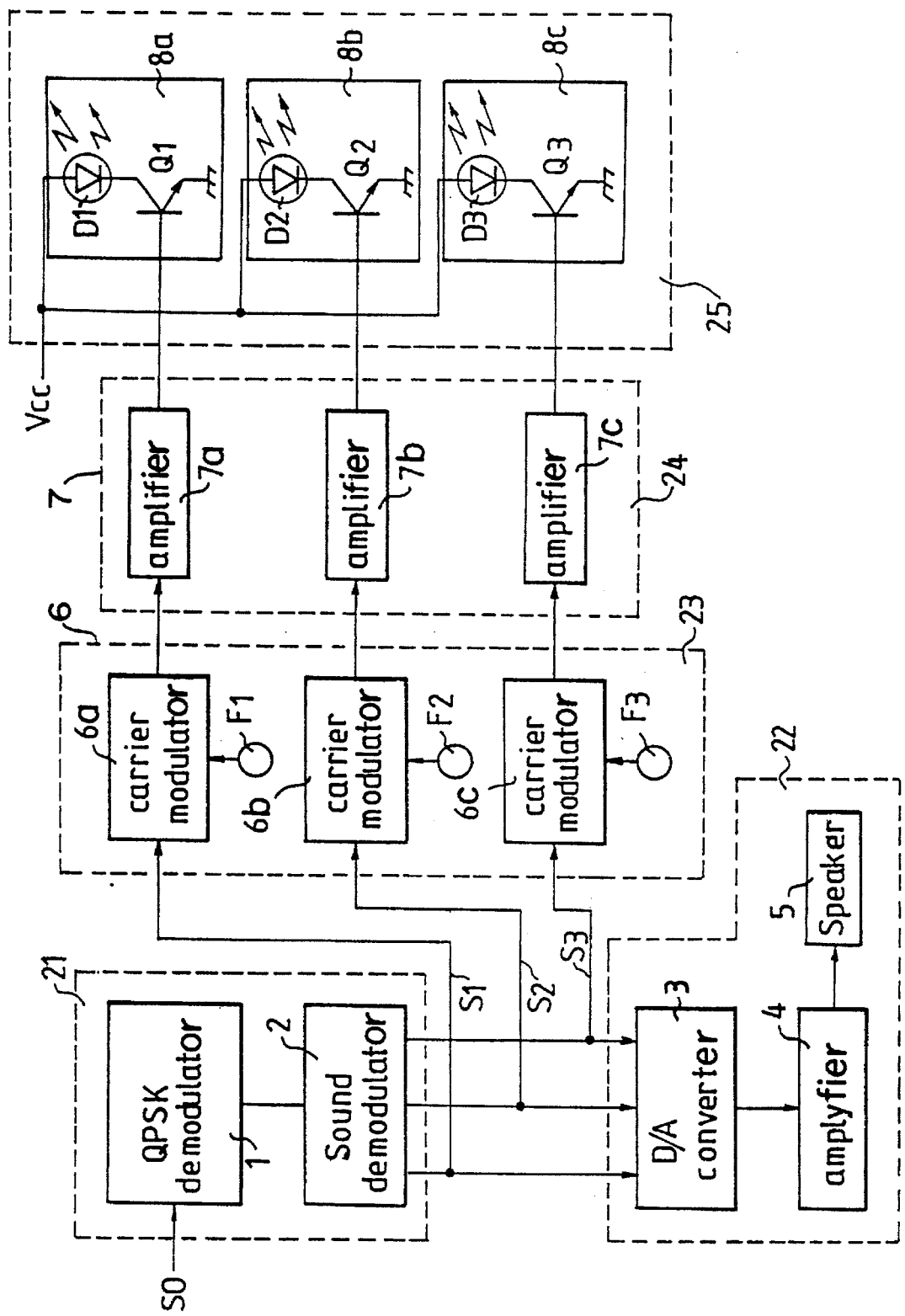
FIG. 3 is a block diagram of transmitting apparatus for a headphone of the digital type in accordance with the present invention.

With reference to FIG. 3, there is shown a block diagram of a transmitting apparatus for a headphone of the digital type in accordance with the present invention. As shown in this drawing, the transmitting apparatus of the present invention comprises: a demodulating circuit 21 including a quadrature phase shift keying (QPSK) demodulator 1 and a sound demodulator 2, for receiving a broadcast sound signal transmitted in a QPSK transmission manner, demodulating the received broadcast signal into a digital signal and dividing the digital signal three-channel data, a first sound output circuit 22 including a D/A converter 3, a first amplifier 4 and a speaker 5, respectively, for converting the three-channel data from the demodulating circuit 21 into an analog signal, amplifying the analog signal by a predetermined amplification degree and outputting the amplified signal through the speaker 5; a frequency modulating circuit 23 including carrier modulators 6a through 6c and frequency oscillators F1 through F3, for frequency-modulating, respectively, the three-channel data from the demodulating circuit 21; an amplifying circuit 24 including amplifiers 7a through 7c, for amplifying output signals from the frequency modulating circuit 23, respectively, to a predetermined transmission level; and a transmitting circuit 25 including infrared transmitters 8a through 8c having transistors Q1 to Q3 and light-emitting diodes D1 to D3, respectively, for transmitting output signals from the amplifying circuit 24 with infrared rays carrying the signals.

Figure 4:
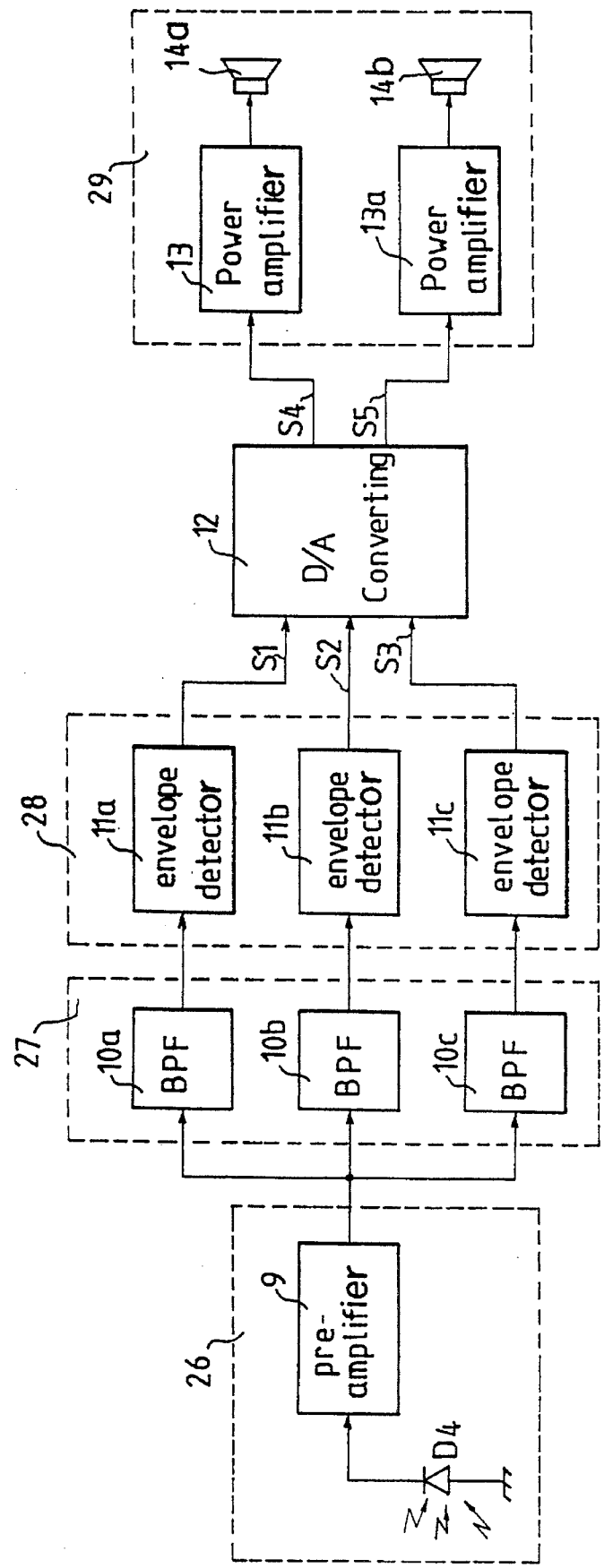
FIG. 4 is a block diagram of receiving apparatus for the headphone of the digital type in accordance with the present invention.

With reference to FIG. 4, there is shown a block diagram of a receiving apparatus for a headphone of the digital type in accordance with the present invention. As shown in this drawing, the receiving apparatus of the present invention comprises a receiving circuit 26 including a light-receiving diode D4 and a preamplifier 9, for receiving signals transmitted from the transmitting circuit 25 in the transmitting apparatus and amplifying the received signals by a predetermined amount, a band-pass filtering circuit 27 including band-pass filters 10a through 10c for filtering, respectively, output signals from the receiving circuit 26 to pass only frequency components of desired band width corresponding to respective channel data, an envelope detecting circuit 28 including envelope detectors 11a through 11c, for detecting envelopes of respective channel data from output signals from the band-pass filtering circuit 27, a D/A converting circuit 12 for converting output signals from the envelope detecting circuit 28 into analog sound signals, and a second sound output circuit 29 including power amplifiers 13a and 13b and speakers 14a and 14b, for amplifying analog signals from the D/A converting circuit 12, respectively, by a predetermined amount and outputting the amplified signals, respectively, through the speakers 14a and 14b.

With reference to FIG. 5, there is shown a block diagram of the D/A converting circuit 12 in the receiving apparatus. The D/A converting circuit 12 includes a timing controller 15 for controlling timing of an output signal from the envelope detecting circuit 28, a digital data latch 16 for latching an output signal from the timing controller 15, a right channel data latch 17 for latching right channel data of an output signal from the digital data latch 16, a left channel data latch 18 for latching left channel data of the output signal from the digital data latch 16, a D/A converter 12a for converting digital data from the left channel data latch 18 into the left analog sound signal, and a D/A converter 12b for converting digital data from the right channel data latch 17 into the right analog sound signal.

Now, the operation of the transmitting and receiving apparatus for a headphone of the digital type with the above-mentioned construction in accordance with the present invention will be described in detail with reference to FIG. 6.

First, when the television set receives a digital audio signal SO transmitted in the QPSK transmission manner (digital transmission manner) from a broadcasting station, the digital audio signal SO is demodulated into a digital signal by the QPSK demodulator 1 in the demodulating circuit 21. The digital signal from the QPSK demodulator 1 is demodulated into digital sound data S1, timing data S2 and digital channel information data S3 by the sound demodulator 2 in the demodulating circuit 21.

In first sound output circuit 22, the D/A converter 3 converts the digital sound data S1, timing data S2 and digital channel information data S3 from the demodulating circuit 21 into an analog signal. Then, the analog signal from the D/A converter 3 is amplified to an aural sound level by the first amplifier 4 and the amplified signal is outputted as a sound signal through the speaker 5 in the television set.

As shown in FIGS. 6a through 6c, the digital sound data S1 are sound data values transmitted from the broadcasting station, the timing data S2 is clock data for synchronization of the digital sound data S1, and the digital channel information data S3 indicates whether the digital sound data S1 is a mono signal or a stereo signal.

Also, the digital sound data S1, timing data S2 and digital channel information data S3 from the demodulating circuit 21 are inputted to the frequency modulating circuit 23. In the frequency modulating circuit 23, the digital sound data S1, timing data S2 and digital channel information data S3 are frequency-modulated, respectively, by carrier modulators 6a through 6c in accordance with carrier frequencies from the frequency oscillators F1 through F3, as shown in FIG. 6d. Typically, in the carrier modulators, the user can directly adjust the frequency oscillators F1 through F3 to vary the modulating frequencies. For this reason, there can be prevented interference due to infrared ray signals from other systems.

Next, the digital sound data S1, timing data S2 and digital channel information data S3 from the frequency modulating circuit 23 are amplified, respectively, to a predetermined transmission level by the amplifiers 7a through 7c in the amplifying circuit 24. Then, the amplified data from the amplifying circuit 24 is transmitted to the receiving apparatus with infrared rays carrying the data by the infrared transmitters 8a through 8c in the transmitting circuit 25.

In the receiving apparatus, the receiving circuit 26 receives the digital sound data S1, timing data S2 and digital channel information data S3 transmitted from the transmitting circuit 25 in the transmitting apparatus by the light-receiving diode D4 therein and amplifies the received data by a predetermined amount by the preamplifier 9 therein. The amplified signal from the receiving circuit 26 is applied to the band-pass filtering circuit 27.

Upon receiving the amplified signal from the receiving circuit 26, the band-pass filters 10a through 10c in the band-pass filtering circuit 27 filter, respectively, the amplified signal from the receiving circuit 26 to pass only frequency components of desired band width corresponding to the digital sound data S1, timing data S2 and digital channel information data S3. Then, the envelope detectors 11a through 11c in the envelope detecting circuit 28 detect envelopes of respective corresponding data, i.e., the digital sound data S1, timing data S2 and digital channel information data S3 from the output signals from the band-pass filtering circuit 27 and output the detected envelopes of respective data to the D/A converting circuit 12.

The D/A converting circuit 12 converts the detected envelopes of the digital sound data S1, timing data S2 and digital channel information data S3 from the envelope detecting circuit 28 into analog sound signals and outputs the analog sound signals to the second sound output circuit 29. Then, in the second aural sound output circuit 29, the analog sound signals from the D/A converter 12 are amplified, respectively, to a sound level by the power amplifiers 13a and 13b and the amplified signals are outputted as sound signals through the speakers 14a and 14b.

Referring again to FIG. 5, upon receiving the digital sound data S1 and the timing data S2, the timing controller 15 in the D/A converter 12 controls a timing of the digital sound data S1 synchronously with the timing data S2. Then, the digital sound data S1 from the timing controller 15 is latched into the digital data latch 16. The digital sound data S1 in the digital data latch 16 is then latched into the left channel data latch 18 or the right channel data latch 17 or both of them in accordance with a content of the digital channel information data S3. Then, the D/A converter 12a converts the digital data from the left channel data latch 18 into the left analog sound signal S4 and the D/A converter 12b converts the digital data from the right channel data latch 17 into the right analog sound signal S5. These analog sound signals S4 and S5 are applied to the second sound output circuit 29.

As hereinbefore described, in accordance with the present invention, there is provided a transmitting and receiving apparatus for a headphone of the digital type, which processes audio signals from the television set or radio set in a frequency modulation (FM) manner, transmits the FM processed signals by wireless in a digital transmission manner and receives the signals by wireless in a digital reception manner. Therefore, the user can listen to noiseless sound through a headphone. Also, since the user can directly adjust the modulating frequencies, there can be prevented an interference due to infrared ray signals from other systems.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A transmitting and receiving apparatus for a headphone, comprising:

transmitting means for demodulating a received broadcast signal to produce digital sound data, timing data and digital channel data from said received broadcast signal, carrier-modulating each produced data in accordance with a different carrier frequency and transmitting each modulated data with an infrared beam, respectively; and receiving means for receiving the carrier-modulated sound data, timing data and channel data transmitted from said transmitting means, demodulating the signals into a digital signal, converting the digital signal into an analog signal, and outputting/transducing the analog signal as sound.

2. The transmitting and receiving apparatus of claim 1, said transmitting means further including, first sound output means for receiving, D/A converting, amplifying, and transducing the digital sound data, timing data and digital channel data to produce sound.

3. The transmitting and receiving apparatus of claim 2, said first sound output means including a D/A converter and an amplifier for providing an analog signal to a speaker of a television set.

4. The transmitting and receiving apparatus of claim 1, said transmitting means including a quadrature phase shift keying demodulator, and wherein the received broadcast signal is a quadrature phase shift keying signal.

5. The transmitting and receiving apparatus of claim 1, said transmitting means including a carrier modulator for each of the digital sound data, timing data, and digital channel data.

6. The transmitting and receiving apparatus of claim 5, each of said carrier modulators including a frequency oscillator with an adjustable modulating frequency to prevent infrared interference.

7. The transmitting and receiving apparatus of claim 5, said transmitting means including an amplifier for each of the modulated digital sound data, timing data, and digital channel data.

8. The transmitting and receiving apparatus of claim 5, said transmitting means including an infrared transmitter for each of the modulated digital sound data, timing data, and digital channel data, each infrared transmitter including a transistor and a light-emitting diode.

9. The transmitting and receiving apparatus of claim 1, said receiving means further including, band pass filtering means for band pass filtering the received data, envelope detecting means for detecting envelopes of the filtered received data, and D/A converting means for receiving and converting the detected envelopes into an analog sound signal.

10. The transmitting and receiving apparatus of claim 9, said receiving means including a light-receiving diode and a preamplifier.

11. The transmitting and receiving apparatus of claim 9, said band pass filtering means including a band pass filter for each of the sound data, timing data, and channel data.

12. The transmitting and receiving apparatus of claim 9, said envelope detecting means including an envelope detector for each of the sound data, timing data, and channel data.

13. The transmitting and receiving apparatus of claim 12, said D/A converting means receiving each of the sound data, timing data, and channel data from the envelope detecting means and outputting a left speaker signal and a right speaker signal.

14. The transmitting and receiving apparatus of claim 13, said D/A converting means including, a timing controller for controlling timing of said envelope detecting means, a data latch for latching an output of said timing controller, left and right channel data latches for latching left and right channel data, respectively, and D/A converters for converting the latched left and right channel data into respective analog signals.

15. The transmitting and receiving apparatus of claim 13, further including a power amplifier and a speaker for a left speaker signal and a right speaker signal.

* * * * *